July 23, 1963  V. A. UNRUH  3,098,396
V-BELT CLUTCH DEVICE
Filed March 1, 1962  2 Sheets-Sheet 1

INVENTOR.
Vernon A. Unruh
BY
ATTORNEY

July 23, 1963  V. A. UNRUH  3,098,396
V-BELT CLUTCH DEVICE
Filed March 1, 1962  2 Sheets-Sheet 2
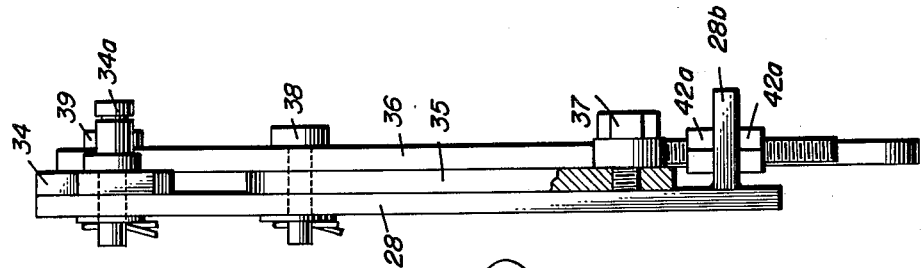
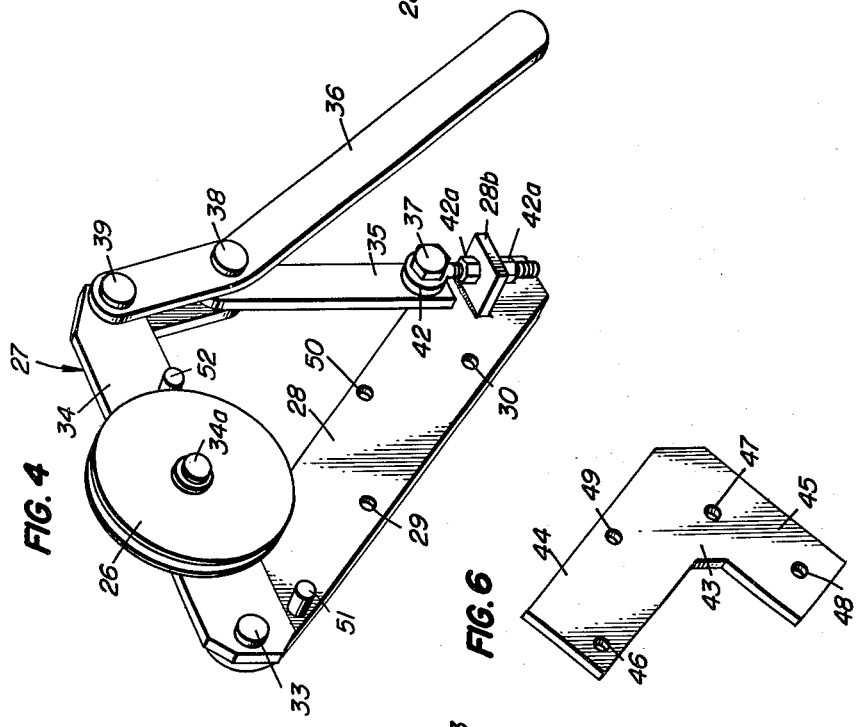
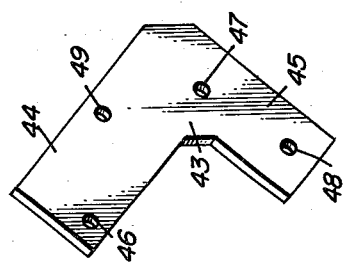
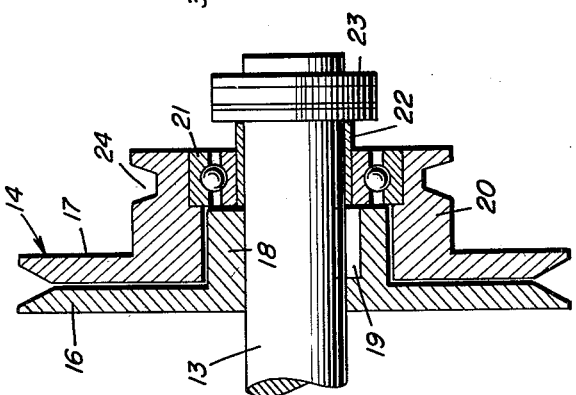
INVENTOR.
Vernon A. Unruh
BY
ATTORNEY 3,098,396
V-BELT CLUTCH DEVICE
Vernon A. Unruh, Rte. 2, Great Bend, Kans.
Filed Mar. 1, 1962, Ser. No. 176,669
5 Claims. (Cl. 74—242)

This invention relates to belt and pulley drives for farm grain loaders and other agricultural machines driven by small gas engines.

The invention contemplates a split pulley device mounted on the crank shaft of the engine and a belt tightening pulley device mounted on the body of the engine, with a V-belt connecting the pullies and serving as the clutch facing so that power is transmitted crosswise through the belt.

The object of the invention is to provide an improved V-belt clutch device which may be quickly and easily installed on engines particularly those now in use and which is of simple, economical and durable construction, so that the device is highly desirable where the use of a conventional clutch is not practical.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

FIG. 3 is a detail sectional view on an enlarged scale showing the split pulley device on the engine crank shaft;

FIG. 4 is an elevational view of the belt tightening pulley and its mounting for one well known type of engine;

FIG. 5 is an edge view of parts shown in FIG. 4; and

FIG. 6 is a detail view of an adaptor useable with the mounting shown in FIG. 4 to permit the device to be mounted on another make of engine.

Figure 1:
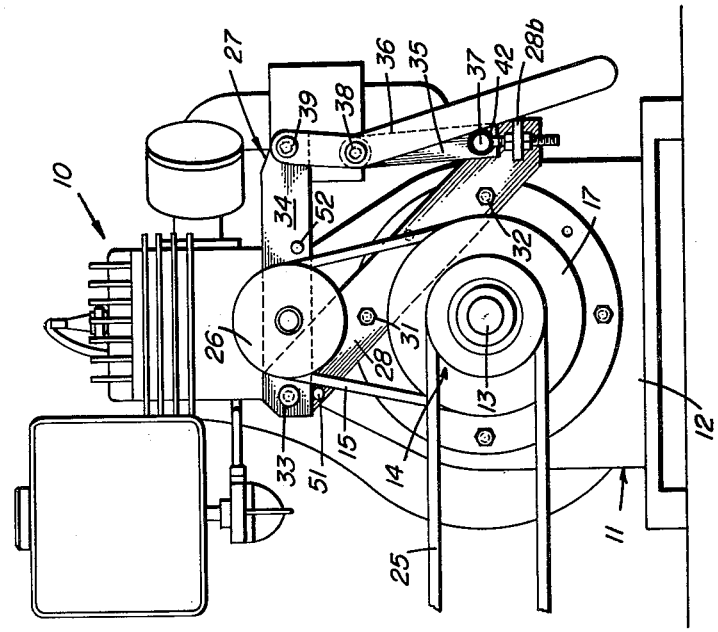
FIG. 1 is a front view of a gasoline engine with the V-belt clutch device applied thereto.
Figure 2:
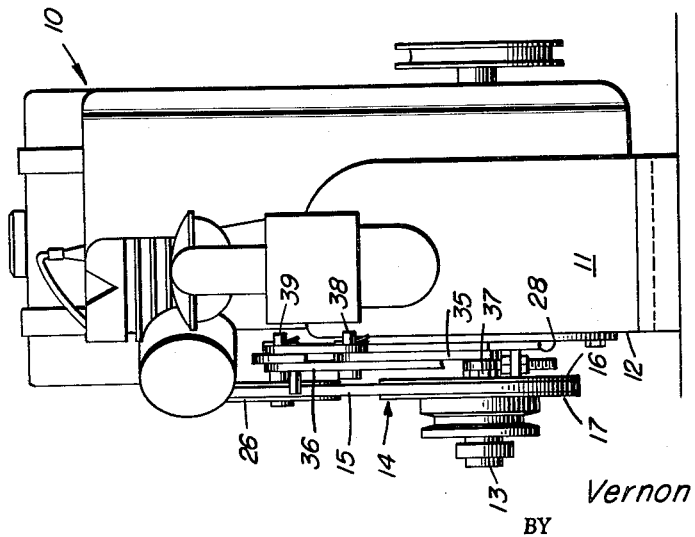
FIG. 2 is a side elevation of FIG. 1.

Referring more in detail to the drawing, the numeral 10 denotes as a whole an internal combustion engine such as a Wisconsin engine of the size commonly used in operating auger type conveyors and similar farm machinery. The engine is conventionally represented and comprises an engine block or body 11 having a flat outer wall 12 through which projects the crank shaft 13 of the engine.

The numeral 14 denotes a split pulley for a V-belt 15, the pulley having one flange 16 fixed to the shaft 13 for rotation therewith and a complementary flange 17 rotatably mounted on the shaft and held against movement axially of the shaft. The flange 16 has an outwardly projecting cylindrical hub 18 which may be fixed to the shaft 13 by a set screw or a key 19 or both. The flange 17 has on its outer face a much larger cylindrical hub 20 which surrounds and is spaced from the hub 18, as seen in FIG. 3, and which is mounted for rotation on the shaft 13, preferably by means of the ball bearing unit 21. The outer race ring of the bearing is positioned against a shoulder in an enlarged end of the bore in the hub 20 and the inner race ring is on a collar or sleeve 22 which may be fastened to the shaft in any suitable manner. I preferably use an eccentric lock collar known as a Fafnir RA 100 NPP bearing and conventionally represented at 23 in FIG. 3.

Formed in the outer portion of the hub 20 is an annular V-shaped groove to provide a pulley or sheave 24 for a driving belt 25 that may operate a conveyor auger or other machine. It will be seen that the parts 17, 20 and 24 form a one and one-half sheave device so that when the belt 15 is tightened on the split pulley or sheave, it will function as a clutch, causing flanges 16 and 17 to rotate together and thus actuate the driving belt 25; and that when the belt 15 is loose only the flange 16 will turn when the engine is in operation and hence the belt 25 will not drive the auger or the like.

The V-belt 15 passes around a pulley or sheave 26 which is rotatable on a linkage assembly 27 mounted directly on the body of the engine and manually operated to shift the pulley 26 away from or towards the split pulley to tighten or loosen the belt 15 and hence to start or stop the driven machine while the engine is running. The assembly or mounting device 27 comprises an attaching member 28 which may be a flat metal plate with spaced holes 29 and 30 to receive machine screws or bolts 31 and 32 threaded into holes in the flat wall 12 of the engine body 11. The plate 28 may be disposed against the wall 12 or slightly spaced therefrom by washers on the bolts. The bolts 31 and 32 are longer bolts that replace shorter bolts on the Wisconsin engine. Near the top of the plate 28 is pivoted at 33 one end of a generally horizontal lever 34. The pulley 26 is journalled on a shaft or pivot 34$^a$ carried by an intermediate portion of the lever 34. Between the free end of the lever 34 and the lower end of the plate 28 is a pair of toggle links 35 and 36. The link 35 has its lower end adjustably pivoted as later described to the lower portion of the plate 28 and its upper end is pivoted at 38 to an intermediate portion of the link 36. The link 36 is longer and of angular shape so that it serves as a hand lever, its upper end being pivoted at 39 to the lever 34.

The link 35 has its lower end adjustably mounted to raise or lower the hand lever or link 36 in order to properly adjust the tension on the belt 15. As shown in FIG. 5 the lower end of the link 35 has a threaded hole to receive a cap screw 37 which passes through the eye of an eye bolt 42. The threaded lower end of the eye bolt passes through a hole in a laterally projecting ear 28$^b$ formed on the lower portion of the mounting plate 28. Nuts 42$^a$ on the bolt above and below the ear permit of the said adjustment.

The two links 35 and 36 are so proportioned that when the handle end of the link or lever 36 is swung downwardly the pulley carrying lever 34 will be elevated and the pivot 38 will pass the dead center of the pivots 37 and 39, and thus retain the pulley 26 in its elevated position to hold the belt 15 in its tightened position on the split pulley 14. By adjusting the bolt 42 the upward tightened movement of the pulley 26 may be controlled to provide the proper tension on the belt 15 when the auger or other machine is being driven. When the toggle linkage is moved to the belt tightened position, the handle end of the lever 36 engages the part 28$^b$. If desired an outwardly projecting pin or stud 51 may be provided on the plate 28 and a similar stud 52 on the lever 34, to coact with the belt 15. These studs clear the belt when the clutch is engaged and squeeze the belt from the clutch facings when released.

The bolt holes on the Briggs-Stratton engine are different from those on the Wisconsin engine, and hence when the device is to be applied on a Briggs-Stratton engine, the adaptor shown in FIG. 6 may be used. This adaptor comprises a right angular metal plate 43 having a long arm 44 and a short arm 45. The arm 44 is is placed against the rear of the mounting plate 28 and is fastened to it by short bolts before the linkage device 27 is fastened to the engine. These short bolts pass through the holes 29 and 30 in the plate 28 and registering holes 46 and 47 formed in the plate 43. The thus assembled plates 28 and 44 are then fastened to the engine body by two bolts or machine screws, which replace other bolts on the engine. One of these bolts passes through a hole 48 in the short arm 45 and the other passes through a hole 49 in the arm 44 and a registering hole 50 formed in the plate 28.

In applying the invention to a gas engine it is simply necessary to remove the old sheave from the crank shaft and replace it with the split pulley device, and to then remove two of the bolts on the engine body and fasten the linkage device 27 by bolts of suitable length. The invention may therefore be quickly and easily installed, and it is to be noted that it is of extremely simple and inexpensive construction. It has been found in practice that the improved clutch device is extremely durable and dependable in operation. The invention has many other advantages since it permits of easier engine starting, permits the machine to be smoothly started under maximum load; permits quick and easy disengagement in emergencies; permits the auger to be moved without stopping the engine, and increases the safety factor in the use of the machinery.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a V-belt clutch device, the combination of an internal combustion engine having a body and a crank shaft projecting therefrom, a split pulley carried by said shaft and having one flange fixed to rotate with said shaft and a complementary flange formed with a hub having an annular groove to provide a pulley for a machine driving belt, means mounting said hub for free rotation on said shaft but holding it against axial movement, a belt tightening pulley mounting and adjusting means comprising a mounting member fixed to the body of the engine, a lever pivoted to said member, a belt-tightening pulley rotatably mounted on said lever and disposed in alinement with the flanges of said split pulley, a V-belt engaged with said split pulley and said belt tightening pulley, means for adjusting said lever, said engine body having a flat wall portion adjacent said projecting crank shaft, said mounting member being a flat plate disposed in parallel relation to said wall portion and fixed thereto, a pivot connecting one end of said lever to one end of said plate to pivotally mount the lever, said belt tightening pulley being mounted on an intermediate portion of said lever, means adjustably connecting the other end of said lever to the other end of said plate to provide said lever adjusting means, said lever adjusting means comprising a toggle lever device comprising long and short links pivoted at one end respectively to said other ends of the lever and the plate, said long link being angular and having the other end of the short link pivoted to its intermediate portion, the other or free end of the long link serving as a handle, and means for adjusting the pivotal connection between said short link and said plate.

2. In a V-belt clutch device, the combination of an internal combustion engine having a body and a crank shaft projecting therefrom, a split pulley carried by said shaft and having one flange fixed to rotate with said shaft and a complementary flange formed with a hub having an annular groove to provide a pulley for a machine driving belt, means mounting said hub for free rotation on said shaft but holding it against axial movement, a belt tightening pulley mounting and adjusting means comprising a mounting member fixed to the body of the engine, a lever pivoted to said member, a belt-tightening pulley rotatably mounted on said lever and disposed in alignment with the flanges of said split pulley, a V-belt engaged with said split pulley and said belt tightening pulley, means for adjusting said lever, said engine body having a flat wall portion adjacent said projecting crank shaft, said mounting member being a flat plate disposed in parallel relation to said wall portion and fixed thereto, a pivot connecting one end of said lever to one end of said plate to pivotally mount the lever, said belt tightening pulley being mounted on an intermediate portion of said lever, means adjustably connecting the other end of said lever to the other end of said plate to provide said lever adjusting means, said lever adjusting means comprising a toggle lever device comprising long and short links pivoted at one end respectively to said other ends of the lever and the plate, said long link being angular and having the other end of the short link pivoted to its intermediate portion, the other or free end of the long link serving as a handle, means for adjusting the pivotal connection between said short link and said plate, said means for adjusting the pivotal connection between said short link and said plate comprising a laterally projecting apertured lug on the lower portion of said plate, an eye bolt adjustable in said lug and a cap screw pivot bolt in the eye of said bolt and threaded into said short link.

3. In a V-belt clutch device, the combination of
   (A) an internal combustion engine having a body and a crankshaft projecting therefrom,
   (B) a split pulley carried by said shaft and having one flange fixed to rotate with said shaft and a complementary flange rotatable on said shaft,
   (C) a cylindrical concentric hub integral with one side of said fixed flange and projecting toward the end of said shaft,
   (D) a large cylindrical concentric hub integral with said rotatable flange and having a bore to receive said first mentioned hub,
   (E) an anti-friction bearing unit disposed in the bore of said larger hub to rotatably support said rotatable flange,
   (F) means on the end of said shaft for retaining said unit on the shaft and preventing movement of said rotatable flange in an axial direction,
   (G) an annular groove in said large hub to provide a pulley for a machine driving belt, and
   (H) a belt tightening pulley mounting and adjusting means comprising
      (a) a generally upright mounting plate fixed to the body of the engine,
      (b) a horizontally disposed lever pivoted at one of its ends to the upper portion of said plate,
      (c) a belt tightening pulley rotatably mounted on an intermediate portion of said lever and disposed in alinement with the flanges of said split pulley,
      (d) a V-belt engaged with said split pulley and said belt tightening pulley,
      (e) toggle linkage between the other end of said lever and the lower portion of said plate comprising short and long links, said long link having its upper end pivoted to said other end of the lever, an adjustable connection between the lower end of said short link and the lower portion of said plate, and a pivotal connection between the upper end of said short link and an intermediate portion of said long link, the free end of said long link serving as a handle for said linkage.

4. In a V-belt clutch device, the combination of
   (A) an engine or other prime mover having a body and a driving shaft projecting therefrom,
   (B) a split pulley carried by said shaft and having one flange fixed to rotate with said shaft and a complementary flange rotatable on said shaft,
   (C) a cylindrical concentric hub integral with said complementary flange and projecting toward the end of said shaft,
   (D) means mounting said hub for free rotation on said shaft but holding it against axial movement,
   (E) an annular groove in said hub to provide a pulley for a machine driving belt, (F) a generally upright mounting plate fixed to said body adjacent said shaft, (G) a generally horizontal lever having one end pivotally connected to the upper portion of said plate, (H) a belt tightening pulley rotatably mounted on an an intermediate portion of said lever and disposed in alinement with the flanges of said split pulley, (I) an upright toggle linkage between the other end of said lever and the lower portion of said plate comprising short and long links, the long link being angular, (J) a pivotal connection between the upper end of said long link and said other end of said lever, (K) a vertically adjustable pivotal connection between the lower end of said short link and the lower portion of said plate, (L) a pivotal connection between the upper end of said short link and an intermediate portion of said long link, the free lower end of the latter serving as a handle for the linkage, the pivotal connection between the two links being adapted to pass the dead center of the pivotal connections at said ends of the links, and (M) a stop on said plate for engagement by the handle end of said long link.

5. In a V-belt clutch device, the combination of (A) an engine or other prime mover having a body and a driving shaft projecting therefrom, (B) a split pulley carried by said shaft and having one flange fixed to rotate with said shaft and a complementary flange rotatable on said shaft, (C) a cylindrical concentric hub integral with said complementary flange and projecting toward the end of said shaft, (D) means mounting said hub for free rotation on said shaft but holding it against axial movement, (E) an annular groove in said hub to provide a pulley for a machine driving belt, (F) a generally horizontal lever disposed crosswise above said shaft, (G) means pivotally mounting one end of said lever upon said body, (H) a belt tightening pulley rotatably mounted on an intermediate portion of said lever and disposed in alignment with said split pulley, (I) an upright toggle linkage operating means having its upper portion pivotally connected to the other end of said lever, and (J) means pivotally connecting the lower portion of the last mentioned means to said body.

References Cited in the file of this patent

UNITED STATES PATENTS

| | | |
|---|---|---|
| 2,903,899 | Bade | Sept. 15, 1959 |
| 2,967,435 | James | Jan. 10, 1961 |
| 3,026,738 | Rahlson | Mar. 27, 1962 |